Oct. 23, 1945.  E. E. MOYER  2,387,601
ELECTRIC CONTROL SYSTEM
Filed May 2, 1942
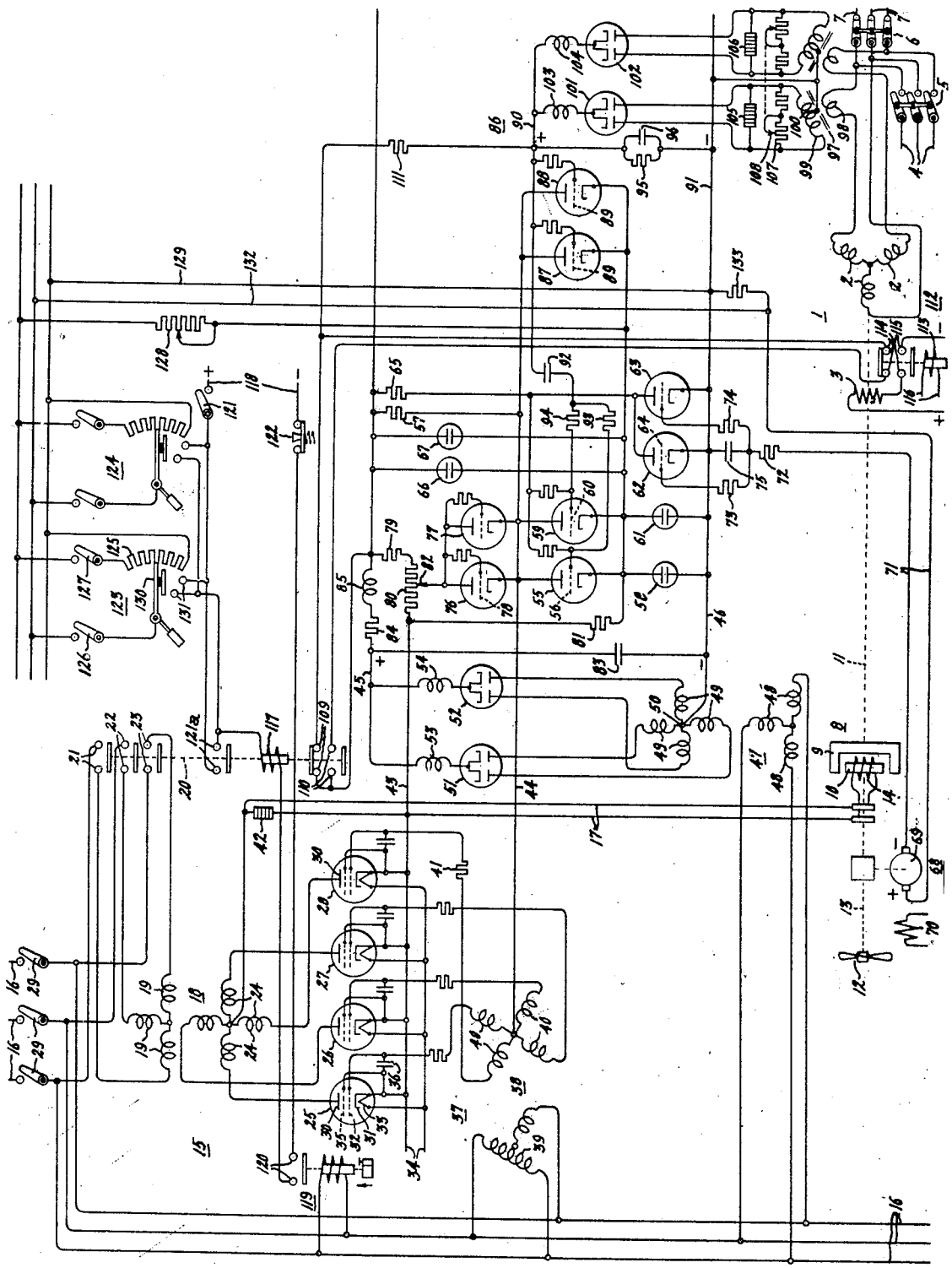
Inventor:
Elmo E. Moyer,
by Harry C. Dunham
His Attorney.

Patented Oct. 23, 1945

2,387,601

UNITED STATES PATENT OFFICE 2,387,601

ELECTRIC CONTROL SYSTEM

Elmo E. Moyer, Scotia, N. Y., assignor to General Electric Company, a corporation of New York Application May 2, 1942, Serial No. 441,450

17 Claims. (Cl. 172—284)

My invention relates to an electric control system and more particularly to a control system for dynamo-electric machines, and to electric valve control circuits.

Electric valve equipment has been found desirable in the control of dynamo-electric machines, such as motors and generators, due to the great precision of control provided thereby. In accordance with the teachings of my invention described hereinafter, I provide a new and improved electric valve or electric discharge control circuit wherein a dynamo-electric machine, such as an alternating current synchronous motor, is controlled.

It is an object of my invention to provide a new and improved electric control system.

It is another object of my invention to provide a new and improved electric valve control system for dynamo-electric machines.

It is a further object of my invention to provide a new and improved electric control system for a dynamo-electric machine such as an alternating current motor of the synchronous type.

It is a still further object of my invention to provide a new and improved electric valve control system for an alternating current motor of the synchronous type and which provides for control of the load imposed on the motor during the starting operation.

It is a still further object of my invention to provide a new and improved electric valve control system for an alternating current synchronous motor which drives a load device, through means such as a magnetic clutch, and in which the output speed of the load device is controlled.

Briefly stated, in the illustrated embodiment of my invention I provide a new and improved electric valve system for an alternating current synchronous motor which drives a load device through a magnetic clutch. The magnetic coupling of the clutch is controlled in response to an operating condition of a driven load device. The electric valve control system not only maintains an operating condition, such as the speed of the load device at a substantially constant value, but also serves to limit the load imposed on the motor during starting and running conditions.

For a better understanding of my invention, reference may be had to the single figure of the drawing taken in connection with the accompanying description and its scope will be pointed out in the appended claims. The single figure of the drawing diagrammatically illustrates an embodiment of my invention as applied to an electric valve control system for an alternating current synchronous motor which drives a load device, such as a fan, through a magnetic clutch.

Referring now to the single figure of the drawing, I have there illustrated my invention as applied to a system for controlling a dynamo-electric machine which may be an alternating current synchronous motor 1 comprising armature windings 2 and a field winding 3. I provide starting means for the synchronous motor 1. This starting means may be any of the conventional arrangements, now well known in the art, for starting a synchronous motor, and for the purposes of illustration I have chosen to represent the starting means as comprising a source of reduced voltage 4 which may be connected to the armature windings 2 by means of a circuit controlling means or switch 5. After the speed of the synchronous motor 1 has attained a predetermined value, the switch 5 is opened and switch 6 is closed, thereby connecting the armature windings 2 to an alternating current circuit 7 of normal operating voltage.

The rotating member of the synchronous motor 1 is connected to load means which may comprise a magnetic clutch 8 having relatively rotatable members 9 and 10, the former of which may be connected to the rotating member of the synchronous motor 1 through a shaft 11, and the latter of which may be connected to a load device, such as a fan 12, through a shaft 13. The magnetic clutch 8 is provided with a control winding 14, the energization of which determines the relative rotation of the members 9 and 10 and, hence, controls the speed of the fan 12. In other words, the energization of the control winding 14 determines the magnetic flux linking the members 9 and 10, and thereby determines the slip between these two members.

I provide current supply means 15 for energizing the control winding 14 of the magnetic clutch 8. This current supply means may comprise an electric valve rectifier which is energized from a suitable alternating current circuit 16 and which is connected to the control winding 14 through a circuit 17. Although not limited thereto, I have chosen to represent the rectifier of the current supply means 15 as constituting a quarter phase rectifying system in which a transformer 18 is provided with primary and secondary windings arranged in the conventional Scott or T-connection. Primary winding means 19 may be connected to the alternating current circuit 16 through a circuit controlling means, such as a contactor 20 having contacts 21—23, inclusive.

Secondary windings 24 are connected to circuit 17 through electric valve means 25—28, inclusive. If desired, switches 29 may be connected between the contacts 21—23 of contactor 20 and the alternating current circuit 16.

Electric valve means 25—28, inclusive, are preferably of the type employing an ionizable medium, such as a gas or a vapor capable of supporting an arc discharge, and each comprises an anode 30, a cathode 31, and a control member such as a control grid 32 which determines the amount of current conducted thereby. Cathode heating elements 33, if employed, may be energized from a suitable source of current 34. In some applications it may be desirable to employ electric valves having shield grids 35 which may be connected directly to the cathodes 31. Transient absorbing capacitances 36 may be connected in the manner illustrated to prevent the impression of extraneous transient voltages on control grids 32.

I also employ an excitation circuit 37 for supplying to the control grids 32 of electric valve means 25—28 an alternating component of grid potential. This portion of the control circuit for the electric valve means 25—28 may include a transformer 38 having primary windings 39 and secondary windings 40, which are also connected in a Scott or T-connection and are phased with respect to the associated anode voltages to have a 120 electrical degree lagging relationship. The windings 40 are connected to the respective associated grids 32 through current limiting resistances 41. I also provide suitable voltage limiting means, such as a resistance 42, connected across the output circuit of the rectifier and connected across the control winding 14. This resistance may be of the type having a negative impedance-current characteristic such as that disclosed and claimed in United States Letters Patent No. 1,822,742, granted September 8, 1931 upon an application of Karl B. McEachron. Resistance 42 serves to prevent excessive voltage transients across winding 14 in the event the electric valve means fail to conduct current at a time when considerable energy is stored in winding 14.

The output of the current supply means 15 or the conductivity of the electric valve means 25—28 is controlled by means of a control circuit comprising conductors 43 and 44. The magnitude of the voltage provided by this control circuit controls the phase position of the resultant voltage impressed on control grids 32 of electric valve means 25—28, and, hence, controls the time during the respective positive half cycles of applied anode-cathode voltage at which the electric valve means begin to conduct current.

I provide a direct current circuit including a positive conductor 45 and a negative conductor 46. This circuit may be energized from the alternating current circuit 16 through a transformer 47 comprising primary windings 48 and secondary windings 49, the latter of which may be provided with an electrical neutral connection 50 which is connected to the negative conductor 46. Diametric windings of the secondary windings 49 constitute, with unidirectional conducting devices or electric valves 51 and 52, a pair of bi-phase rectifiers for energizing the direct current circuit comprising conductors 45 and 46. Smoothing reactances 53 and 54 are connected between the electric valves 51 and 52 and the positive conductor 45. It will be observed that by virtue of this connection continuity of energization of the direct current circuit is provided, even though one rectifier circuit fails.

Control means are provided for controlling the energization of the control winding 14 to maintain a predetermined operating condition of the load device at a predetermined constant value. In the embodiment of my invention illustrated, I provide means for maintaining an operating condition such as the speed of the fan 12 constant. In addition, I also provide armature current limiting means or armature current preset means for controlling the maximum value of armature current of the motor 1 during the starting and running operations.

The control means which controls the voltage difference appearing between conductors 43 and 44 and which controls the current transmitted by electric valve means 25—28 may comprise an electric discharge device 55 provided with a grid 56. The discharge device 55, which is preferably of the high vacuum type, may be connected in series relation with a resistance 57 and a constant voltage reference means, such as a glow discharge valve 58, which when in a conducting condition maintains across its terminals a substantially constant voltage. For the purpose of assuring continuity of service, a second electric discharge device 59 having a grid 60 may be connected in parallel with the discharge device 55, and a second glow discharge valve 61 may be connected in parallel with the glow discharge valve 58. Electric discharge devices 55 and 59 conduct variable amounts of current through resistance 57, thereby controlling the potential of conductor 44 relative to conductor 43 and consequently controlling the voltage impressed on control grids 32 of electric valve means 25—28, inclusive.

Control electric discharge devices 62 and 63 provided with grids 64 may be employed for controlling the potential of grids 56 and 60 of electric discharge devices 55 and 59. The anode-cathode circuits of the control discharge devices 62 and 63 are in parallel and are connected in series relation with a resistance 65 across conductors 45 and 46. The control discharge devices 62 and 63 transmit variable amounts of current through resistance 65 and consequently control the potential impressed on grids 56 and 60 of discharge devices 55 and 59. The potential of the cathodes of the electric discharge devices 55 and 59 may be maintained at a substantially constant value, below the potential of conductor 45, by means of glow discharge valves 66 and 67, which also may be connected in parallel in order to assure continuity of service.

As a means for deriving a control voltage which is responsive to a predetermined operating condition of the fan 12, such as the speed thereof, I provide a tachometer generator 68 having an armature 69 and a field winding 70. The armature 69 of the tachometer generator 68 is connected to control electric discharge devices 62 and 63 through circuit 71 and through apparatus described hereinafter. The negative terminal of circuit 71 is connected to grids 64 of control electric discharge devices 62 and 63 through a resistance 72 and current limiting resistances 73 and 74. I also provide a filter or damping means which may comprise a capacitance 75 which is connected between the common juncture of resistances 72, 73, and 74, and the cathodes of discharge devices 62 and 63. In this manner, the rate of variation of the potential impressed on control grids 64 of discharge devices 62 and 63 is controlled to prevent hunting or overshooting of the fan speed.

In order to effect a rapid build-down of the current in the control winding 14 when the system indicates a rapid deenergization of control winding 14, I provide means for controlling the electric valves 25–28, inclusive, to act as an inverter, wherein the decrement of the electromagnetic energy stored in control winding 14 is transferred to alternating current circuit 16. This feature of control is disclosed and broadly claimed in United States Letters Patent No. 2,239,429, granted April 22, 1941, upon my application and which is assigned to the assignee of the present application. More particularly, I provide electric discharge devices 76 and 77 which may be connected in parallel. It is to be understood that a single discharge device would perform the function satisfactorily and that the two discharge devices are employed in order to assure continuity of service. Each of the discharge devices 76 and 77 is provided with a control grid 78 which is energized by a voltage which is responsive to the magnitude and polarity of the unidirectional voltage appearing across conductors 43 and 44. This control voltage may be obtained by means of a voltage divider comprising serially connected resistances 79, 80 and 81 which are connected between the positive conductor 45 of the direct current circuit and the upper terminal of the glow discharge valves 58 and 61. Resistance 80 is provided with an adjustable contactor 82 which controls the time at which the electric discharge devices 76 and 77 initiate the inversion operation.

Armature current limit means or armature current pre-set means 86 are provided to limit the effective range of operation of electric discharge devices 55 and 59. The armature current preset means may comprise electric discharge devices 87 and 88 having grids 89. The discharge devices 87 and 88 are employed as a pair to assure continuity of service, and only one device is necessary in order to carry out the function. The discharge devices 87 and 88 are also connected in parallel with the electric discharge devices 55 and 59 and thereby limit the anode-cathode voltage thereof by conducting different amounts of current.

The potential impressed on grids 89 of electric discharge devices 87 and 88 is controlled by means of a control circuit including conductors 90 and 91. The grids 89 are also connected to grids 56 and 60 of electric discharge devices 55 and 59 through an anti-hunting or damping circuit including a capacitance 92 and resistances 93 and 94. When the voltage of the circuit comprising conductors 90 and 91 rises to a sufficiently positive value, the electric discharge devices 87 and 88 conduct an increased amount of current, thereby limiting the range of operation of discharge devices 55 and 59, and discharge devices 55 and 59 are thereby rendered conducting to an extent which lowers the potential impressed on conductor 44 relative to conductor 43 to limit the conductivity of electric valve means 25–28 to a value which will not cause excessive current to be consumed by the motor 1. The capacitance 92 operates as a damping or anti-hunting means, thereby controlling the rate of application of voltage to grids 56 and 60 of electric discharge devices 55 and 59. A further damping and filter circuit comprising parallel connected resistance 95 and capacitor 96 may be connected across conductors 90 and 91 to limit the effective rate of change of the potential difference therebetween.

I provide, in the armature current preset means 86, means for impressing on the circuit including conductors 90 and 91 a unidirectional voltage the magnitude of which varies in response to the current of the polyphase alternating current circuit 7. This latter means comprises a pair of biphase rectifiers energized in accordance with the currents of different phases of the polyphase circuit 7 and each comprises a transformer 97 having a primary winding 98 which may be connected in series relation with the phase conductor, and a secondary winding 99 provided with an electrical neutral connection 100. The electrical neutral connections 100 are joined together and are connected to the negative conductor 91. Each of the biphase rectifiers comprises a pair of unidirectional conducting paths which may be furnished by electric valves 101 and 102; and current limiting inductances 103 and 104 are connected between the positive conductor 90 and valves 101 and 102.

Voltage limiting means, such as resistances 105 and 106, may be connected across secondary windings 99 of the transformers, and may be of a material such as that described in the above mentioned McEachron patent. I also connect across the secondary windings 99 voltage controlling or adjusting means which may comprise voltage dividers including resistances 107 having mechanically coupled adjustable contacts 108, so that upon adjustment of one means the other is automatically adjusted to the same value thereby assuring the desired current limit or current preset if one of the biphase rectifiers fails.

I provide means for presetting the initial current transmitted by the current supply means 15, thereby controlling the rate of application of load to the synchronous motor 1 during the starting and running operation thereof. In this manner, the load is applied gradually to the motor. One way in which this gradual application of load to motor 1 may be effected is by limiting the maximum conductivity of the electric valve means 25—28 and, hence, limiting the maximum initial energization of control winding 14. More particularly, the initial energization of the winding 14 may be limited by biasing the control electric discharge devices to a predetermined initial degree of conductivity.

One way in which the desired initial presetting of the system may be provided is by interlocking the contactor 20 with the portion of the control system including the electric discharge devices. For example, the contactor 20 may be provided with contacts 109 and 110 which are connected between the positive terminal or conductor 45 and the conductor 90 through a resistance 111. In this manner, the potential of conductor 90 is initially established, thereby pre-establishing the degree of conductivity of electric discharge devices 55 and 59 and, hence, pre-establishing the initial current to be conducted by electric valve means 25—28, inclusive.

Contact 110 of contactor 20 is interlocked through the field energization initiating system for the synchronous motor 1, so that the current conducted by supply means 15 is maintained at a predetermined value until the synchronous motor 1 attains the desired predetermined speed at which the field winding 3 may be energized. I provide means, such as a frequency responsive relay 112 having an actuating coil 113 and contacts 114 and 115. Actuating coil 113 may be energized from a circuit 116 which is energized in response to the frequency of the currents induced in the field winding 3 of the synchronous motor 1, so that relay 112 is energized to close contacts 115 when the speed attains a predetermined value. Upon closure of contacts 115, unidirectional current is transmitted to the field winding 3, thereby causing the motor 1 to step into synchronism. Contacts 114 are connected in circuit with contacts 110 of contactor 20 so that the initial conductivity of the electric valve means 25—28 is maintained until the field winding 3 is energized, or until the speed of the motor 1 has attained a value which permits synchronous operation thereof.

Actuating coil 117 of contactor 20 is arranged to be energized from a suitable source of control current 118 through apparatus described immediately hereinafter. In order to prevent connection of the electric valve means 25—28, inclusive, to the alternating current circuit 16 for a predetermined time to permit the cathodes thereof to assume a safe operating temperature, I employ a time delay relay 119 having contacts 120 connected in series relation with the actuating coil 117. Contactor 20 is also provided with sealing-in contacts 121a. An auxiliary starting switch 121 may be connected in series relation with the actuating coil 117, but is not effective of course until the actuating coil 117 has been energized by apparatus described hereinafter. A stop circuit controlling means, such as a stop switch 122, is connected in circuit with coil 117 and this means is, of course, effective upon actuation at all times to disconnect the current supply means 15 from the alternating current circuit 16.

I provide control circuits 123 and 124 which may be physically displaced from each other and which may constitute remote control stations for pre-establishing the initial load imposed on synchronous motor 1 and for presetting the speed or controlling the speed of the fan 12. Circuits 123 and 124 each comprise a voltage divider including a resistance 125 which is connected, through switch 127 in parallel with valves 58 and 61, and through switch 126 the contact 130 of which is connected to circuit 71 to control electric discharge devices 62 and 63. More particularly, the resistances 125 are connected to the upper or positive terminals of glow discharge devices 58 and 61 through an adjustable means, such as an adjustable resistance 128, the function of which will be explained hereinafter. Other terminals of resistance 125 are connected to the negative terminals of the glow discharge devices 58 and 61 through a conductor 129. Each of the control circuits 123 and 124 is provided with an adjustable contact 130 the position of which determines the speed of the fan 12 and which consequently, in order to obtain this effect, determines the conductivity of the electric discharge devices 55, 59, 62 and 63. As a means for presetting these discharge devices so that the system is in a condition which will not impose a severe starting load on the synchronous motor 1, the contacts 130 are provided with interlocking contacts 131 which prevent energization of the actuating coil 117 of contactor 20, unless the electric discharge devices 55, 59, 62 and 63 are set to establish the proper starting condition. Adjustable contacts 130 are connected to the positive conductor of circuit 71 through a conductor 132. A resistance 133 is connected between conductor 132 and the negative conductor 46 of the direct current circuit. Resistance 128 determines the maximum speed of the fan 12 when contact arm 130 is moved to the switch end 127 of resistance 125.

The operation of the embodiment of my invention shown in the single figure of the drawing will be explained by considering the system first during the starting operation. Switch 121 is closed and switches 29 are closed, the contactor initiating the energization of the time delay relay 119 which closes its contacts 120 a predetermined interval of time after the energization thereof. If it be assumed that it is desired to control the system by means of circuit 123, its switches 126 and 127 are closed. Energization of the actuating coil 117 of contactor 20 will not be effected until the contact 130 associated with the voltage divider 125 is adjusted to the predetermined lower position, effecting closure of contacts 131 and initially biasing the electric discharge control system to a condition which assures a predetermined initial energization of the control winding 14, thereby assuring that a heavy starting load will not be imposed on the motor 1. Upon closing contacts 131, actuating coil 117 is energized effecting operation of contactor 20 which, through its contacts 21—23, connects primary windings 19 of transformer 18 to the alternating current circuit 16. Upon such operation, the sealing-in contacts 121a are closed so that the adjustable contact 130 in control circuit 123 may be subsequently moved to a position along resistance 125 which pre-establishes the desired speed of the fan 12. However, the speed responsive part of the control system does not become effective until operation of apparatus described immediately hereinafter.

It will be noted that by virtue of contacts 109 of contactor 20 during the time prior to the operation of contactor 20, the electric discharge devices 55 and 59 have been maintained at a predetermined degree of conductivity, as determined by the ratio of resistances 111 and 95, to lower the potential impressed on control grids 32 of electric valve means 25—28, inclusive, to a value which limits the amount of current transmitted to the control winding 14.

Of course, the synchronous motor has been started by first connecting the source of reduced voltage 4 to the armature windings 2 through switch 5, and when the speed attains a sufficiently high value, switch 5 is opened and switch 6 is closed thereby connecting the armature winding 2 to the alternating current circuit 7 of normal operating voltage. When the speed of synchronous motor 1 attains a predetermined value established by the adjustment of the frequency responsive relay 112, this relay will operate energizing the field winding 3 with direct current and effecting opening of its interlocking contacts 114. These latter contacts maintain the potential of conductor 90 at a value which prevents the increase of current to the control winding 14 until the motor 1 has attained a sufficient speed, or until the motor 1 is operating in synchronism.

It will be noted that during the starting operation, means are provided for maintaining the load on the electric valve means to a value below that which would impose a severe load or overload on the motor 1.

During normal operation of the system, variable amounts of unidirectional current are transmitted to the control winding 14 of the magnetic clutch 8 by electric valve means 25—28 to maintain the speed of the fan 12 at a precisely constant value. The amount of current transmitted by the electric valve means 25—28 is determined by the magnitude of the unidirectional voltage impressed on the control grids 32 by means of the circuit including conductors 43 and 44. Of course, the resultant voltage impressed on control grids 32 comprises an alternating component of voltage provided by secondary windings 40 and a unidirectional component of voltage of either positive or negative value determined by the operation of the electric discharge devices 55, 59 or 76, 77. As the magnitude of the voltage produced by control circuit including conductors 43 and 44 becomes less negative or more positive, the electric valve means 25—28 conduct a greater amount of current, and conversely as the voltage becomes more negative the electric valve means conduct a smaller amount of current.

The operation of the tachometer generator 68 and the control circuit which energizes the circuit including conductors 43 and 44 will now be considered. During normal ranges of operation, the potential difference appearing between conductors 43 and 44 changes in response to the speed of the fan 12 so that upon an increase in speed above a predetermined value or speed level, the output of the electric valve means 25—28 will tend to decrease, thereby permitting a greater slip between the members 9 and 10 of the magnetic clutch 8. On the other hand, upon a decrease in speed below the preset value the output current of the electric valve means 25—28 will be increased, thereby decreasing the slip between the members 9 and 10 of the clutch 8 and tending to restore the speed of the fan 12 to the desired value. The output voltage of the tachometer generator 68, effective through circuit 71 and which is proportional to the speed of the fan 12, is measured against a predetermined portion of the standard or reference voltage which is determined or established by the glow discharge valves 58 and 61. The amount of this standard voltage which is preselected by means of the voltage divider including resistance 125 in circuit 123 and resistor 128 determines the voltage which the tachometer generator 68 must attain in order to control the output of the electric valve means 25—28. The difference between the output of the tachometer generator 68 and the predetermined percentage of the glow discharge valve reference voltage is amplified by the control electric discharge devices 62 and 63, and the amplified voltage or signal is applied to the grids of discharge devices 55 and 59. Discharge devices 55 and 59 may be considered to constitute the variable impedance arm of a Wheatstone bridge, the other three arms of which are resistance 57, resistance 79, resistance 80, and resistance 81. When the voltage applied to the grids 56 and 60 of discharge devices 55 and 59 is such that the voltage drop across 57 is equal to that across resistance 79 and resistance 80, then the output voltage from the bridge is zero, and so is the unidirectional component of voltage between conductors 43 and 44 so that the output current of the electric valve means 25—28 will be that corresponding to a point within the control range. If grids 56 and 60 of electric discharge devices 55 and 59 are made less negative, or positive, with respect to their associated cathodes, the potential of conductor 44 will be depressed or lowered, and will be negative in polarity with respect to conductor 43, because discharge devices 55 and 59 will pass more current and the voltage drop across resistance 57 will be greater than that across resistance 79 and resistance 80.

When the potential of conductor 44 is negative with respect to conductor 43, the control point of the grids 32 of electric valve means 25—28 are lagging in phase by a greater amount and the output from the electric valve means is decreased. Conversely, when the grids 56 and 60 of discharge devices 55 and 59 are made less positive or more negative, the potential of conductor 44 will rise because discharge devices 55 and 59 will pass less current, and the voltage drop across resistance 57 will be less than that across resistance 79 and resistance 80. When the potential of conductor 44 is positive with respect to conductor 43, then the grid control point of electric valve means 25—28 is advanced in phase, and the output of the electric valves is increased. Thus, upon an increase in tachometer speed and output voltage above the preset value determined by the adjustment of contact 130 in control circuit 123, the grids of the discharge devices 62 and 63 become less positive or more negative, so that these tubes transmit less current and the lower terminal of resistance 65 rises in potential so that the grids of discharge devices 55 and 59 become less negative, or more positive, and discharge devices 55 and 59 transmit more current so that conductor 44 is depressed or lowered in potential, thereby phasing back the grid potentials of the electric valve means 25—28 and decreasing the excitation current transmitted to the control winding 14, so that the speed of the fan 12 is caused to decrease until an equilibrium condition is reached.

The current limit or preset means 86 serves to limit the armature current of the synchronous motor 1. The current limit control is obtained by causing a unidirectional voltage to appear between conductors 90 and 91 proportional to the armature current of motor 1, and to cause electric discharge devices 87 and 88 to shunt electric discharge devices 55 and 59 and hence, take control away from the latter discharge devices when the armature current attains the value preset by the current limiting means 86. The voltage appearing between conductors 90 and 91 is compared against the reference voltage produced by glow discharge valves 58 and 61, and when the armature current of the synchronous motor tends to exceed a predetermined value this voltage between these conductors will be approximately equal to the standard voltage provided by the glow discharge values. Under this condition, the grids 99 of the discharge devices 87 and 88 will tend to become less negative, or more positive, so that these discharge devices transmit a greater amount of current, thereby making the voltage drop across resistance 57 greater than that across resistance 79 and resistance 80, and consequently depressing or lowering the potential of conductor 44. In this manner, the conductivity of the electric valve means 25—28 is decreased, causing a decrease in the excitation current transmitted to control winding 14 to unload the synchronous motor 1 sufficiently to permit its armature current to decrease below the point at which the current will fall off to establish an equilibrium condition. Under this equilibrium condition, the voltage appearing between conductors 90 and 91 is just sufficient to control discharge devices 87 and 88 to furnish exactly the desired coupling excitation to the magnetic clutch 8. When the discharge devices 87 and 88 are coming into operation, discharge devices 55 and 59 are being unloaded because of a consequent fall in speed as indicated by the tachometer generator output voltage.

In view of the above description of the system, it will be apparent that at a predetermined value of armature current the control of the system is transferred from the voltage responsive position of the circuit to the armature current preset means 86, thereby limiting the load imposed on the motor 1. It will thus be appreciated that electric discharge devices 55 and 59, through the control operations of discharge devices 62, 63, and 87, 88 are selectively responsive to the speed controlling operation and the armature current preset means 86 or the armature current of the synchronous motor 1.

The operation of the current preset means 86 will now be considered in detail when the system is initiated in its operation, that is, when starting the synchronous motor from standstill. During this starting operation, sudden application of load to the synchronous motor 1 is prevented. Adjustment of resistance 108 determines at which value of armature current the transfer from armature current control to speed control becomes effective. The take-over control involving resistors 111 and 95 and contacts 109 of device 20 causes a potential to appear between conductors 90 and 91, and appears in effect as though there were an excessive or high armature winding current in motor 1. This voltage occurs prior to any such overload current so that discharge devices 87 and 88 control electric valve means 25—28 to maintain a low degree of conductivity thereof. When the contactor 20 is energized, its contact 109 releases this take-over control, provided, of course, that the frequency responsive relay 112 is closed, and the voltage appearing between conductors 90 and 91 which does not in effect represent an overload armature current condition but may be considered as representative of a fictitious condition, is allowed to decrementally decrease until it is sustained by a true or actual armature current condition obtained from the armature current indicating or controlling means comprising the biphase rectifiers of the armature current preset means 86. Adjustment of resistance 108 sets the value of the voltage between conductors 90 and 91 and in a sense determines at what value of armature current the control shifts into either current limit operation or speed control operation. The ratio of the potential between conductors 90 and 91 to the armature current is adjusted by means of voltage dividers comprising resistances 107 and 108 in the two biphase rectifiers. The voltage impressed across conductors 90 and 91 then represents the armature current of the motor 1.

In the event the synchronous motor 1 falls out of step, relay 112 will be opened, and if contactor 20 is closed will apply a voltage to the circuit including conductors 90 and 91 which causes electric discharge devices 87 and 88 to reduce the coupling of the clutch 8 or to maintain it at a relatively low value, so that when synchronous motor re-synchronizes and when relay 112 closes, the coupling of the clutch 8 will be applied gradually and not suddenly as the voltage between conductors 90 and 91 decreases. When this voltage decreases sufficiently, the control of the system will be taken over by the load responsive portion of the control system.

Because the control system could lower the potential of conductor 44 sufficiently so that the grids of the electric valve means 25—28 would be effective to render these electric valve means completely nonconducting when the speed responsive system indicates a substantial deenergization of the control winding 14, the range of the biasing potential impressed on grids 32, that is, the negative valve, is limited to control electric value means 25—28 to act as an inverter, thereby transferring the decrement of electromagnetic energy of winding 14 to the alternating current circuit 16. The electric discharge devices 76 and 77 establish a limit to the negative potential to which the conductor 44 may be lowered with respect to conductor 43. This controlling effect is obtained when conductor 44 tends to assume a potential below that level determined by the adjustable contact 82 of resistance 80. When the potential difference between conductors 43 and 44 attains a predetermined value, electric discharge devices 76 and 77 conduct current to maintain the potential of conductor 44 at this predetermined maximum negative value in spite of the tendency of electric discharge devices 55 and 59 or discharge devices 87 and 88 to depress the potential of conductor 44 to a value more negative.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current circuit, an alternating current synchronous motor including armature and field windings, starting means for said synchronous motor comprising means for connecting said armature winding to said alternating current circuit, means responsive to the speed of said synchronous motor for effecting the energization of said field winding when the speed of said motor attains a predetermined value, means driven by said motor and comprising a magnetic clutch including a control winding, a load device driven by said clutch, a second alternating current circuit, means connected between said second alternating current circuit and said control winding and including a plurality of electric valve means each having a control member for controlling the current conducted thereby, means energized from said second alternating current circuit for energizing a direct current control circuit, a pair of serially connected electric discharge devices connected to be energized from said direct current circuit and each comprising a grid, means for connecting said discharge devices to the control members, means connected to the grid of one of said discharge devices for controlling the conductivity thereof in response to the speed of said load device, means connected to the grid of the other discharge device for controlling the conductivity thereof to cause said plurality of electric valve means to operate as an inverter to transmit energy from said control winding to said second alternating current circuit when the last mentioned means dictates a reduction in speed of said load device, and current limit means responsive to the armature current of said motor for controlling said one electric discharge device and to limit its range of operation when the armature current tends to exceed a predetermined value.

2. In combination, an alternating current circuit, an alternating current synchronous motor including armature and field windings, starting means for said synchronous motor comprising means for connecting said armature winding to said alternating current circuit, means responsive to the speed of said synchronous motor for effecting energization of said field winding when the speed of said motor attains a predetermined value, means driven by said motor and comprising a magnetic clutch including a control winding, a load device driven by said clutch, a second alternating current circuit, means connected between said second alternating current circuit and said control winding and including a plurality of electric valve means each having a control member for controlling the current conducted thereby, means energized from said second alternating current circuit for energizing a direct current control circuit, a pair of serially connected electric discharge devices connected to be energized from said direct current circuit and each comprising a grid, means for connecting said discharge devices to the control members, means connected to the grid of one of said discharge devices for controlling the conductivity thereof in response to the speed of said load device, means connected to the grid of the other discharge device for controlling the conductivity thereof to cause said plurality of electric valve means to operate as an inverter to transmit energy from said control winding to said second alternating current circuit when the last mentioned means dictates a substantial reduction in speed of said load device, current limit means responsive to the armature current of said motor for controlling said one electric discharge device and to limit its range of operation when the armature current tends to exceed a predetermined value, and means connected to modify the operation of said last mentioned means during the starting period of said motor for controlling said one discharge device to establish a predetermined maximum degree of conductivity of said plurality of electric valve means.

3. In combination, a source of current, a motor, load means driven by said motor and comprising a control winding, current supply means connected to said source for energizing said control winding, circuit controlling means interposed between said source and said current supply means for controlling the connection therebetween, said circuit controlling means comprising switching means and an actuating coil therefor, control means for determining the current transmitted by said current supply means, means for presetting a condition of said control means, and means actuated by said last mentioned means for controlling the energization of said actuating coil.

4. In combination, an alternating current circuit, an alternating current motor of the synchronous type comprising armature and field windings, starting means for said synchronous motor, load means driven by said motor and comprising a control winding for controlling the load imposed on said motor, electric valve means for variably energizing said control winding, means responsive to the armature current for controlling said electric valve means, and means comprising a source of control voltage connected to modify said last mentioned means independently of variations of said armature current for controlling the conductivity of said electric valve means to limit the maximum conductivity thereof during the starting operation.

5. In combination, an alternating current circuit, a synchronous motor having armature and field windings, starting means for said motor comprising means for connecting said armature winding to said alternating current circuit, means responsive to the speed of said motor for effecting energization of said field winding, load means driven by said motor, means for controlling the load imposed on said motor and comprising a control electric discharge device, a source of control potential of fixed value sufficient to render said discharge device conductive, and means responsive to the speed responsive means for impressing said control potential upon said discharge device during subsynchronous operation of said motor.

6. In combination, an alternating current circuit, a synchronous motor having armature and field windings, starting means for said motor, load means driven by said motor and comprising a control winding, electric valve means for variably energizing said control winding, means responsive to the speed of said synchronous motor during the starting operation for energizing the field winding when the speed attains a predetermined value, means for providing a fixed component of control voltage and a component of control voltage variable in accordance with the current of said armature winding, armature current preset means jointly responsive to said components of voltage for controlling said electric valve means to limit the load imposed on said motor and for limiting the current transmitted to said armature winding, control means responsive to a predetermined operating condition of said load means, and means selectively responsive to the armature current preset means and said control means for controlling the conductivity of said electric valve means.

7. In combination, an alternating current circuit, a synchronous motor having armature and field windings, the armature winding being connected to said alternating current circuit, starting means for said synchronous motor, load means driven by said motor and comprising a control winding, means for variably energizing said control winding to control the load imposed on said motor, and voltage control means connected to modify the operation of said last mentioned means for initiating energization of said control winding at a value of energization substantially lower than its maximum operating limit.

8. In combination, an alternating current circuit, a synchronous motor having armature and field windings, starting means for said synchronous motor comprising means for connecting the armature winding to said alternating current circuit, load means driven by said motor and comprising a control winding for controlling the load imposed on said motor, means for variably energizing said control winding, means for selectively energizing and deenergizing the last mentioned means, control means for the means which energizes said control winding, and voltage control means connected to modify the energization of said control means upon initiation of the energization of said control winding for effecting only relatively small values of current change therein so that the application of load to said motor is effected gradually.

9. In combination, an alternating current circuit, a synchronous motor having armature and field windings, said armature winding being connected to said alternating current circuit, means for energizing the field winding, load means driven by said motor and comprising a control winding for determining the load imposed on said motor, means for transmitting variable amounts of current to said control winding comprising electric valve means of the controlled type having a control member for controlling the conductivity thereof, control means including a source of voltage for applying a variable voltage to said control member, and means for initiating the energization of said control winding comprising means including a second source of voltage for superimposing upon the voltage of said control means a different voltage of a value to establish a predetermined initial conductivity of said electric valve means lower than the conductivity established by said control means separately.

10. In combination, an alternating current circuit, a synchronous motor having armature and field windings, the armature winding being connected to said circuit, means for energizing the field winding, load means driven by said motor and comprising a control winding, means for energizing said control winding comprising electric valve means having a control member, means responsive to a predetermined operating condition of said load means for controlling the conductivity of said electric valve means and comprising an electric discharge device, and means for initiating energization of said control winding comprising a voltage divider connected to said last mentioned means to provide a component of voltage so as to modify the operation of said discharge device for pre-establishing the value of said electrical condition which is to be maintained and for permitting initiation of the energization of said control winding at only a relatively low value of current so that the load is gradually applied to said motor.

11. In combination, an alternating current circuit, a synchronous motor having armature and field windings, the armature winding being connected to said circuit, means for energizing the field winding, load means driven by said motor and comprising a control winding, means for energizing said control winding comprising electric valve means having a control member, means responsive to a predetermined operating condition of said load means for controlling the conductivity of said electric valve means and comprising an electric discharge device, and means for initiating energization of said control winding comprising a voltage divider connected to said electric discharge device and comprising an adjustable contact provided with an auxiliary contact which permits energization of said electric valve means only when a predetermined degree of conductivity is preestablished.

12. In combination, an alternating current circuit, a synchronous motor having armature and field windings, the armature winding being connected to said circuit, means for energizing the field winding, load means driven by said motor and comprising a control winding, means for energizing said control winding comprising electric valve means having a control member, means responsive to a predetermined operating condition of said load means for controlling the conductivity of said electric valve means and comprising an electric discharge device, a second electric discharge device connected in parallel with the first mentioned electric discharge device, and armature current limiting means connected to said second electric discharge device for rendering said second electric discharge device conductive thereby rendering ineffective the first mentioned electric discharge device.

13. In combination, an electric circuit, a motor connected to said circuit, load means driven by said motor and comprising a control winding, an alternating current circuit, means comprising electric valve means for variably energizing said control winding, said electric valve means including a control member, means energized from said alternating current circuit for energizing a direct current circuit and comprising rectifying means, a pair of electric discharge devices energized in series relation from said direct current circuit, means for controlling the conductivity of one of the discharge devices in response to a predetermined operating condition of said load means, and means for controlling the conductivity of the other discharge device to cause said electric valve means to operate as an inverter to transmit energy from said control winding to said alternating current circuit when the last mentioned means dictates a reduction in the energization of said control winding.

14. In combination, an alternating current supply circuit, an alternating current synchronous motor comprising an armature winding connected to said supply circuit and including a field winding, means for starting said synchronous motor, load means connected to said motor and comprising a control winding for controlling the load imposed on said motor, means for variably energizing said control winding comprising electric valve means, means for controlling said electric valve means in response to a predetermined condition derived from said load means, means responsive to the motor armature current and effective to supersede the control effected by said fourth mentioned means during the starting operation for limiting the current supplied to said control winding by said electric valve means, means for initiating energization of said field winding, and means for rendering said control from the current responsive means and said fourth mentioned means simultaneously effective in response to the operation of said field winding energizing means.

15. In combination, an alternating current supply circuit, an alternating current motor of the synchronous type comprising an armature winding and a field winding, said armature winding being connected to said alternating current circuit, means for starting said motor, load means driven by said motor and including a control winding, means for variably energizing said control winding comprising electric valve means, means responsive to a predetermined operating condition of said load means for controlling said electric valve means, means for initiating energization of said field winding, means responsive to the armature current of said motor and dominating the control of said load means response during subsynchronous speed of said motor for limiting the energization of said control winding during the starting operation, and means responsive to the field initiating means for transferring the control of said electric valve means from current response to load means response.

16. In combination, an alternating current circuit, an alternating current motor of the synchronous type comprising an armature winding and a field winding, said armature winding being connected to said alternating current circuit, means for energizing said field winding, load means driven by said motor and including a control winding, electric valve means connected to a source of alternating current for variably energizing said control winding and comprising a control member for controlling the current conducted thereby, means responsive to a predetermined operating condition of said load means for controlling the potential impressed on said control member, means for limiting the range of operation of the voltage impressed on said control member to cause said electric valve means to operate as an inverter to transfer a predetermined portion of the electromagnetic energy stored in said control winding to said source, and means responsive to the armature current of said motor for transferring the control of said electric valve means from response to said load means to armature current response when the armature current attains a predetermined value.

17. In combination, an alternating current supply circuit, a dynamo-electric machine of the synchronous type energized from said supply circuit, a load device, means connected between said machine and said load device and including a magnetic clutch comprising a pair of relatively rotatable members one of which includes a control winding for determining the relative rotation of said members, means for variably energizing said control winding comprising electric valve means, means responsive to the speed of said load device for producing a control voltage continuously variable in proportion to said speed, and means for controlling said electric valve means in accordance with said control voltage.

ELMO E. MOYER.